US010627005B2

(12) United States Patent
Chang et al.

(10) Patent No.: US 10,627,005 B2
(45) Date of Patent: Apr. 21, 2020

(54) VALVE ASSEMBLY CAPABLE OF INDICATING DEPTH

(71) Applicant: Globe Union Industrial Corp., Taichung (TW)

(72) Inventors: Tachun Chang, Taichung (TW); Yueping Xiao, Shen Zen (CN); Kaizhong He, Shen Zen (CN)

(73) Assignee: Globe Union Industrial Corp., Taichung (TW)

( * ) Notice: Subject to any disclaimer, the term of this patent is extended or adjusted under 35 U.S.C. 154(b) by 41 days.

(21) Appl. No.: 16/021,274

(22) Filed: Jun. 28, 2018

(65) Prior Publication Data
US 2019/0242488 A1  Aug. 8, 2019

(30) Foreign Application Priority Data

Feb. 8, 2018  (CN) .................... 2018 2 0230885 U (51) Int. Cl.
| *F16K 27/12* | (2006.01) |
| *G01B 5/18* | (2006.01) |
| *E03C 1/02* | (2006.01) |
| *F16K 11/00* | (2006.01) |
| *B23P 19/10* | (2006.01) |

(52) U.S. Cl.
CPC .............. *F16K 27/12* (2013.01); *E03C 1/023* (2013.01); *G01B 5/18* (2013.01); *B23P 19/10* (2013.01); *F16K 11/00* (2013.01)

(58) Field of Classification Search
CPC .......... E03C 1/021; E03C 1/023; E03C 1/042; E03C 2001/026; E03C 2001/028; B23P 19/10; F16K 11/00; F16K 27/12; G01B 5/18
USPC .................................................. 137/359, 360
See application file for complete search history.

(56) References Cited

U.S. PATENT DOCUMENTS

| 4,896,381 | A | * | 1/1990 | Hutto ...................... E03C 1/042 137/359 |
| 5,031,658 | A | * | 7/1991 | Brattoli ................... E03C 1/042 137/360 |
| 8,627,844 | B2 | * | 1/2014 | Allen ............................ 137/359 |
| 9,222,244 | B2 | * | 12/2015 | Holt ....................... E03B 9/025 |
| 2004/0050423 | A1 | * | 3/2004 | Schoenweger ......... E03C 1/021 137/360 |
| 2006/0231140 | A1 | * | 10/2006 | McNerney ............. E03C 1/021 137/360 |

(Continued)

*Primary Examiner* — Kevin F Murphy
*Assistant Examiner* — Jonathan J Waddy
(74) *Attorney, Agent, or Firm* — Alan D. Kamrath; Karin L. Williams; Mayer & Williams PC (57) ABSTRACT

A valve assembly capable of indicating a depth contains: a body and a protective cover. The body includes a holder. The protective cover is connected with the holder of the body, and the protective cover includes a fitting portion configured to fit with the holder, a peripheral portion surrounding the fitting portion, and at least one connection portion configured to connect with the fitting portion and the peripheral portion. The peripheral portion has an external fence, a front fence, a marking portion formed on at least one side of the peripheral portion, and multiple indication parts arranged on the marking portion and configured to denote depths among the multiple indication pails and the front fence respectively.

21 Claims, 10 Drawing Sheets

(56) References Cited

U.S. PATENT DOCUMENTS

| | | | |
|---|---|---|---|
| 2009/0007971 A1* | 1/2009 | Ball | E04G 15/061 137/315.12 |
| 2010/0116359 A1* | 5/2010 | Ball | E03C 1/042 137/360 |
| 2011/0100484 A1* | 5/2011 | Allen | E03C 1/023 137/359 |
| 2012/0145258 A1* | 6/2012 | Yang | E03C 1/042 137/359 |
| 2015/0191900 A1* | 7/2015 | Johnson | E03C 1/023 137/625.19 |
| 2017/0002551 A1* | 1/2017 | Zhou | E03C 1/021 |
| 2017/0059053 A1* | 3/2017 | Aykens | E03C 1/021 |
| 2019/0085539 A1* | 3/2019 | Li | E03C 1/042 |

\* cited by examiner

VALVE ASSEMBLY CAPABLE OF INDICATING DEPTH

FIELD OF THE INVENTION

The present invention relates to a temperature control valve or a thermostatic valve of bathroom equipment and more particularly to a valve assembly capable of indicating depth.

BACKGROUND OF THE INVENTION

A temperature control valve or a thermostatic valve assembly of bathroom equipment is employed to adjust or set a temperature of a water supply. A conventional valve assembly is mounted on a wall of a bathroom and contains a body on which a holder is formed. The holder includes an accommodation chamber configured to accommodate a mixing valve covered by a decoration cover, and the holder includes a control bar for controlling the mixing valve. The holder includes a cold-water inflow connector horizontally extending from a first side thereof, a hot-water inflow connector horizontally extending from a second side of the holder opposite to the cold-water inflow connector, a first outflow connector, and a second outflow connector. Thereby, after cold water from the cold-water inflow connector and hot water from the hot-water inflow connector flow into the holder, they are controlled by the control bar so as to adjust flow and mixing rate of mixing water of the cold water and the hot water in the mixing valve, and the mixing water is controlled to flow toward the first outflow connector and the second outflow connector at a predetermined flow and a set temperature. Furthermore the mixing valve mates with a pressure balance valve so as to obtain a constant temperature.

The first outflow connector is in connection to a shower via an upper water tube, and the second outflow connector is coupled to a faucet via a lower water tube. The cold-water inflow connector has a first fixer configured to house a first stop set, and the hot-water inflow connector has a second fixer configured to house a second stop set, such that the cold water and the hot water respectively flowing through the cold-water inflow connector and the hot-water inflow connector are controlled to flow or stop flowing in maintenance.

In construction of a building, the cold-water inflow pipe, the hot-water inflow pipe, and the mixing-water outflow pipe are housed in a basic wall, such as a wooden wall, so as to test water leakage. Thereafter, tiles or other decoration materials are adhered on the basic wall. To avoid damage the valve assembly, a protective cover is connected with the body so as to protect the accommodation chamber.

A front fence of the protective cover has a depth higher than the basic wall and equal to a depth of construction, and outer walls of the tiles and other decoration material flush with the protective cover, after adhering the tiles or other decoration materials on the basic wall. To preserve the depth, a height of the protective cover higher than the basic wall is measured by a ruler or other measurement tools, when the valve assembly is locked on a wooden rack in the basic wall, thus causing measurement inconvenience and errors.

Before testing the water leakage, the protective cover is removed from the holder by unscrewing the screw bolts from the protective cover and the holder so as to fix a testing lid in the accommodation chamber, thus testing the water leakage. Thereafter, the protective cover is connected with the holder by screwing the screw bolts via the holder and the protective cover, after testing the water leakage and detaching the testing lid, thus having troublesome test of the water leakage.

The present invention has arisen to mitigate and/or obviate the afore-described disadvantages.

SUMMARY OF THE INVENTION

The primary aspect of the present invention is to provide a valve assembly capable of indicating a depth which adjusts a fixing depth of the valve assembly by way of the multiple indication parts of the protective cover easily.

Another aspect of the present invention is to provide a valve assembly capable of indicating a depth in which the protective cover is fixed or is removed quickly and easily so as to facilitate installation, testing of water leakage, maintenance, and replacement.

To obtain the above aspect, a valve assembly capable of indicating a depth provided by the present invention contains: a body and a protective cover.

The body includes a holder.

The protective cover is connected with the holder of the body, and the protective cover includes a fitting portion configured to fit with the holder, a peripheral portion surrounding the fitting portion, and at least one connection portion configured to connect with the fitting portion and the peripheral portion. The peripheral portion has an external fence, a front fence, a marking portion formed on at least one side of the peripheral portion, and multiple indication parts arranged on the marking portion and configured to denote depths among the multiple indication parts and the front fence respectively.

As connecting the valve assembly, the cold-water inflow pipe, the hot-water inflow pipe, the upper water tube or the lower water tube, the user learns a distance between the basic wall and the outer face of the finished wall by way of each indication part. Thereby, the outer face of the finished wall flushes with the front fence of the protective cover as connecting the valve assembly. Each indication part of the protective cover is capable of determining a fixing depth of the valve assembly quickly by adjusting a thickness and a position of the wooden rack.

No matter the body is connected in the first direction or the second direction, the positioning plate is fixed exactly after being removed and turned 180 degrees upside down so that the arrow of the positioning plate faces upward, and the arrow of the protective cover indicates upward.

Preferably, a foolproof device is defined between the protective cover and the positioning plate so as to be applicable for the cold-water inflow seat and the hot-water inflow seat which extend horizontally, wherein the arrow of the positioning plate faces upward. After the body is in connection with the cold-water inflow pipe, the hot-water inflow pipe, the upper water tube, and the lower water tube, the positioning plate is fixed quickly after being turned upside down.

The protective cover is connected with and removed from the body easily and quickly by using the positioning plate so as to facilitate the pressure test and the maintenance. Preferably, the protective cover is connected with the body directly by way of screwing element(s), and the each indication part of the protective cover is capable of determining the fixing depth of the valve assembly.

DETAILED DESCRIPTION OF THE PREFERRED EMBODIMENTS

Figure 1:
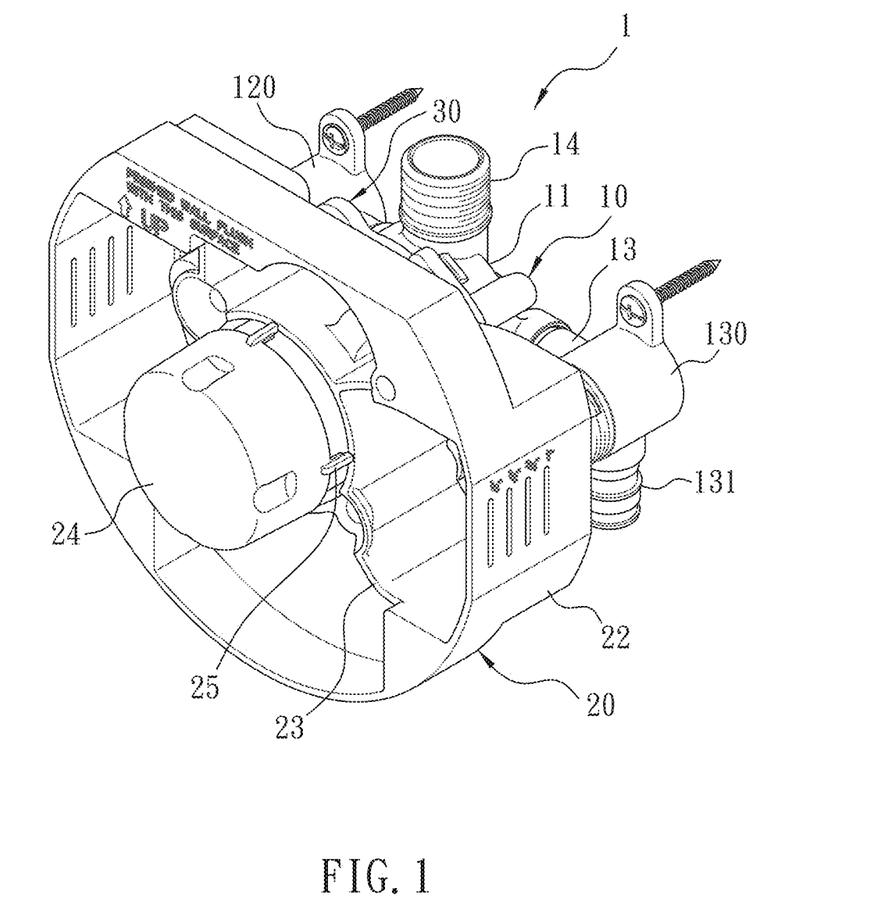
FIG. 1 is a perspective view showing the assembly of a valve assembly capable of indicating a depth according to a preferred embodiment of the present invention.
Figure 2:
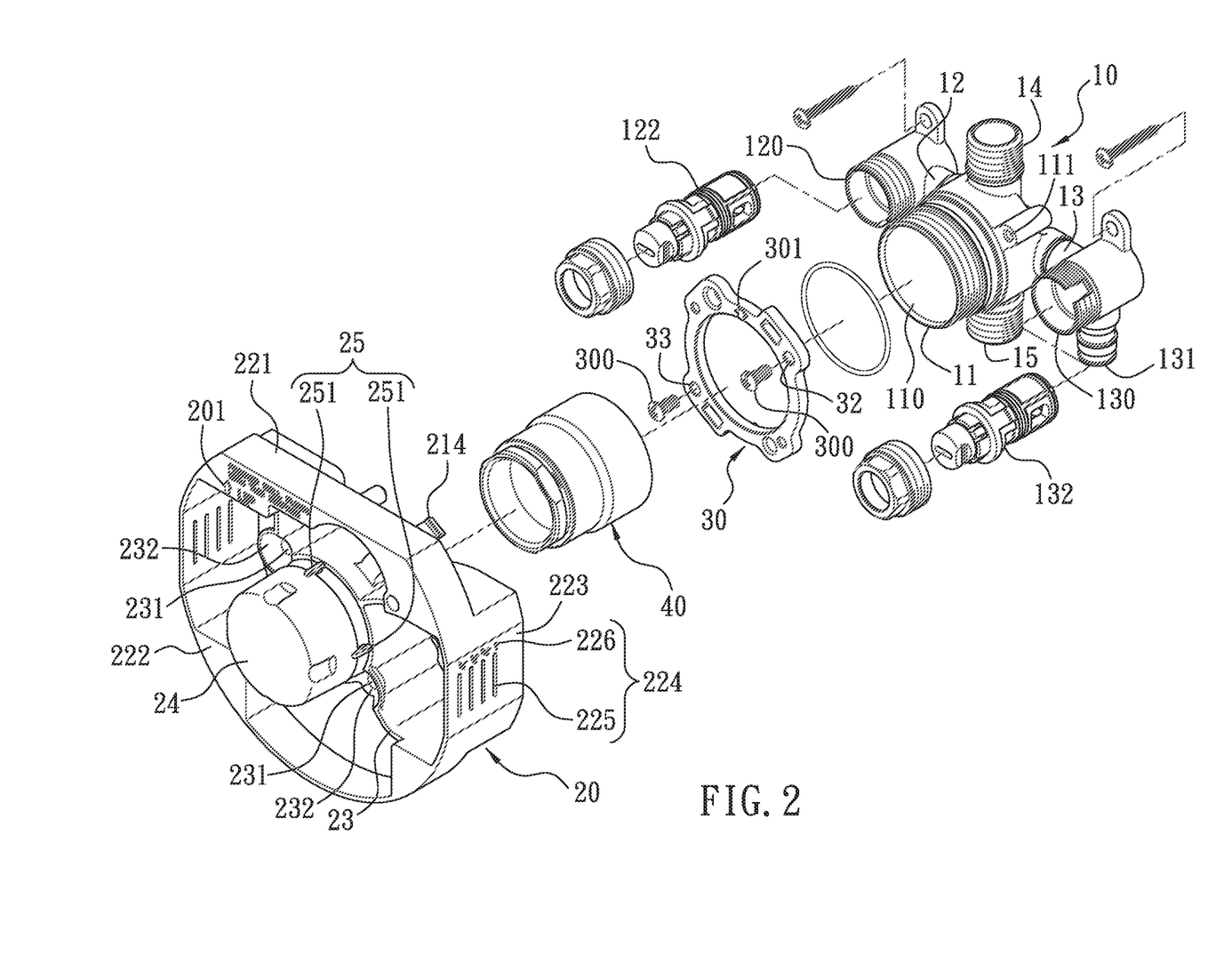
FIG. 2 is a perspective view showing the exploded components of the valve assembly capable of indicating the depth according to the preferred, embodiment of the present invention.
Figure 3:
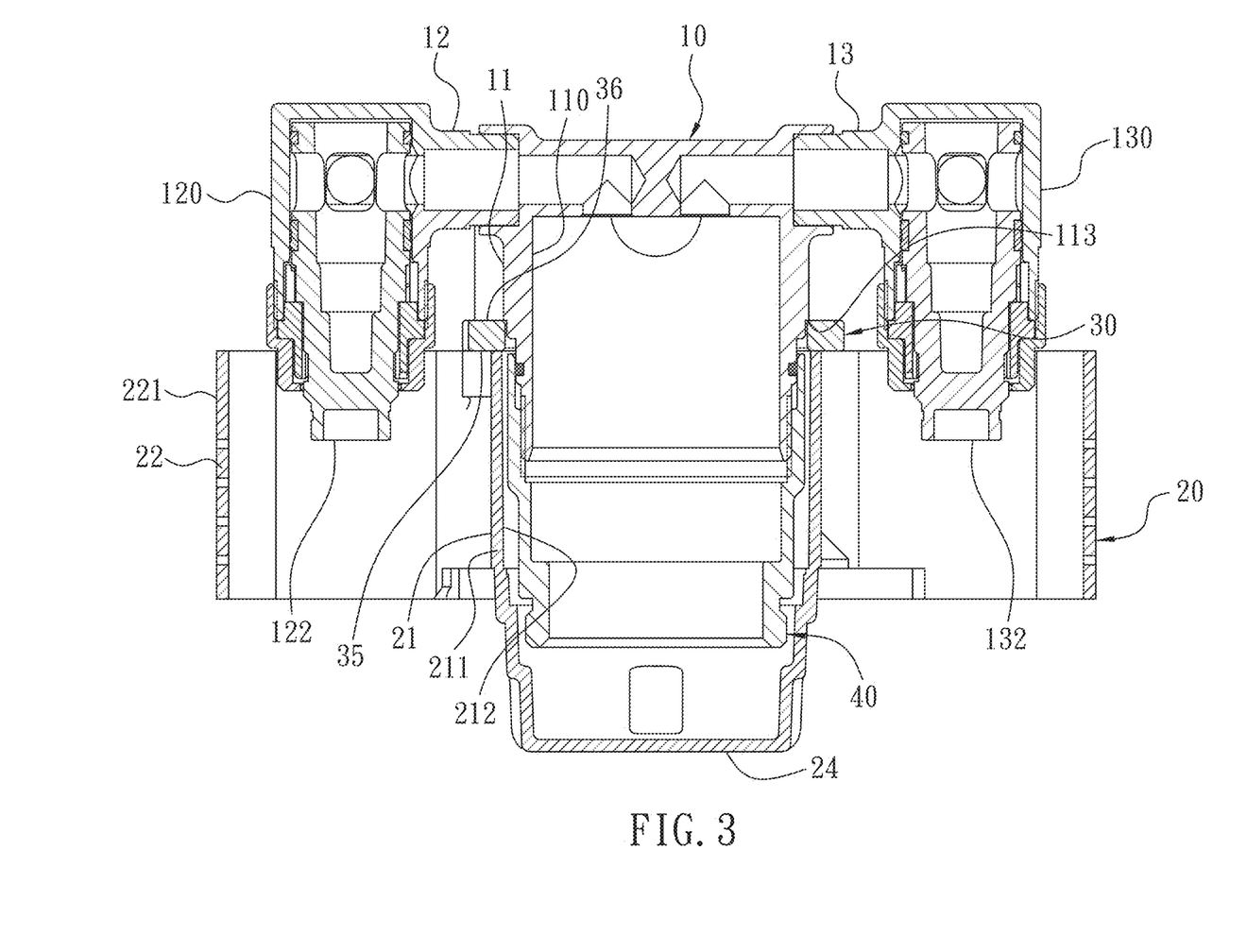
FIG. 3 is a cross sectional view showing the assembly of the valve assembly capable of indicating the depth according to the preferred embodiment of the present invention.

With reference to FIGS. 1-3, a valve assembly 1 capable of indicating a depth according to a preferred embodiment of the present invention comprises: a body 10 and a protective cover 20.

The body 10 includes a holder 11.

Figure 4:
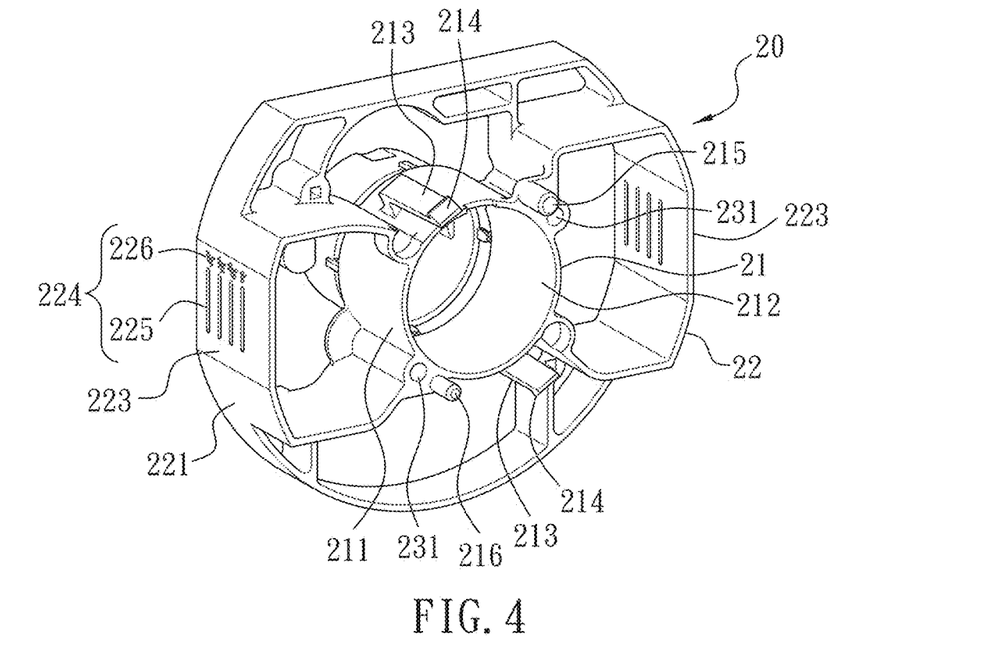
FIG. 4 is a cross sectional view showing the assembly of a part of the valve assembly capable of indicating the depth according to the preferred embodiment of the present invention.

Referring to FIG. 4, the protective cover 20 is connected with the holder 11 of the body 10, and the protective cover 20 includes a fitting portion 21 configured to fit with the holder 11, a peripheral portion 22 surrounding the fitting portion 21, and multiple connection portions 23 configured to connect with the fitting portion 21 and the peripheral portion 22; wherein the peripheral portion 22 has an external fence 221, a front fence 222, a marking, portion 223 formed on at least one side of the peripheral portion 22, and multiple indication parts 224 arranged on the marking portion 223 and configured to denote depths among the multiple indication parts 224 and the front fence 222 respectively. The protective cover 20 includes two marking portions 223 arranged on two sides of the external fence 221 individually.

Each of the multiple indication parts 224 has at least one elongated element 225 longitudinally arranged thereon, wherein each elongated element 225 is any one of a through hole, a recessed slot, and a rib. Alternatively, each elongated element 225 is any one of a protrusion, a depression, and a stepped element.

Each indication part 224 further has a size symbol 226 corresponding to each elongated element 225 so as to denote a depth between each elongated element 225 and the front fence 222.

The fitting portion 21 of the protective cover 20 has a cylindrical fence 211 in which a notch 212 is defined so as to fit with an outer wall of the holder 11. The protective cover 20 further includes a capping portion 24 configured to cover the notch 212, and the protective cover 20 includes a connection portion 25 configured to connect with the cylindrical fence 211 and the capping portion 24. The connection portion 25 is manually snapped by a user so as to remove the capping portion 24 from the fitting portion 21.

The connection, portion 25 has multiple elongated wings 251 configured to be manually snapped by twisting the capping portion 24.

Figure 5:
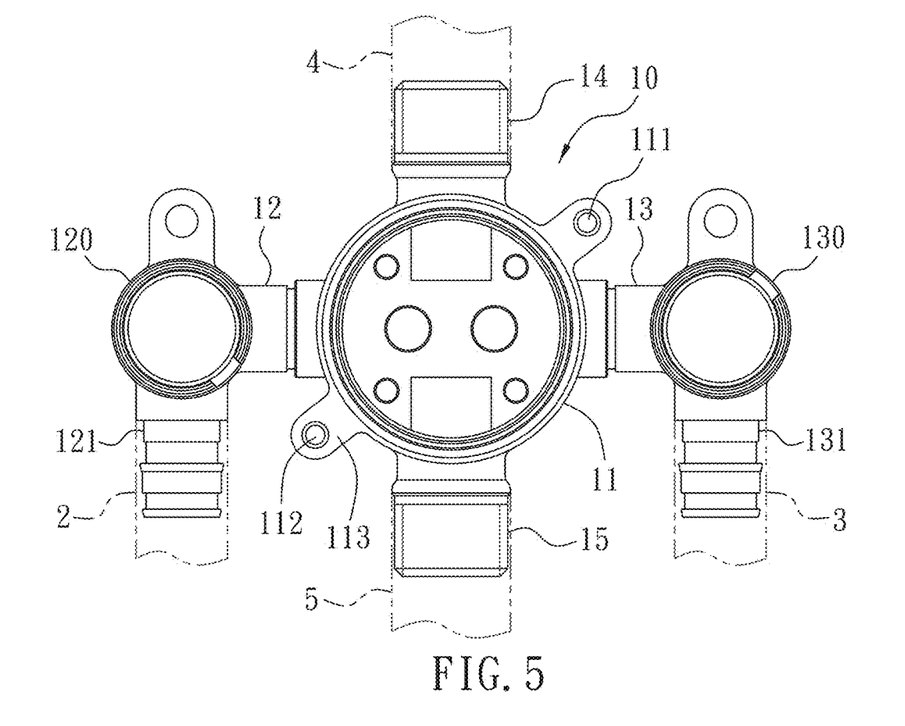
FIG. 5 is a side plan view showing the operation of a part of the valve assembly capable of indicating the depth according to the preferred embodiment of the present invention.

As shown in FIGS. 2 and 5, the holder 11 includes a cold-water inflow connector 12 horizontally extending from a first side thereof, a hot-water inflow connector 13 horizontally extending from a second side of the holder 11 opposite to the cold-water inflow connector 12, a first outflow connector 14 vertically extending from a top of the holder 11, and a second outflow connector 15 vertically extending from a bottom of the holder 11 opposite to the first outflow connector 14. The cold-water inflow connector 12 has a cold-water inflow seat 121 configured to connect with a cold-water inflow pipe 2, and the hot-water inflow connector 13 has a hot-water inflow seat 131 configured to connect with a hot-water inflow pipe 3. The holder 11 further includes a first coupling portion 111 and a second coupling portion 112 extending on the outer wall thereof.

Figure 6:
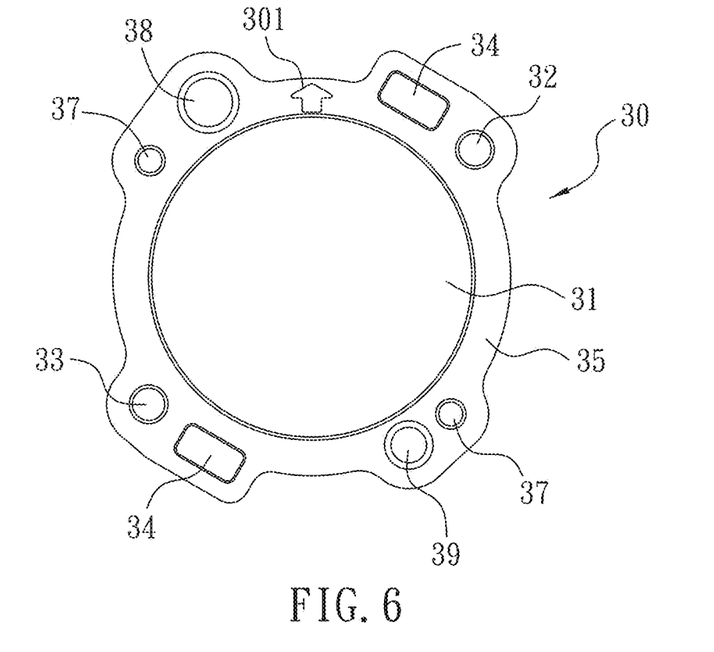
FIG. 6 is a side plan view showing the assembly of a pail of the valve assembly capable of indicating the depth according, to the preferred embodiment of the present invention.
Figure 8:
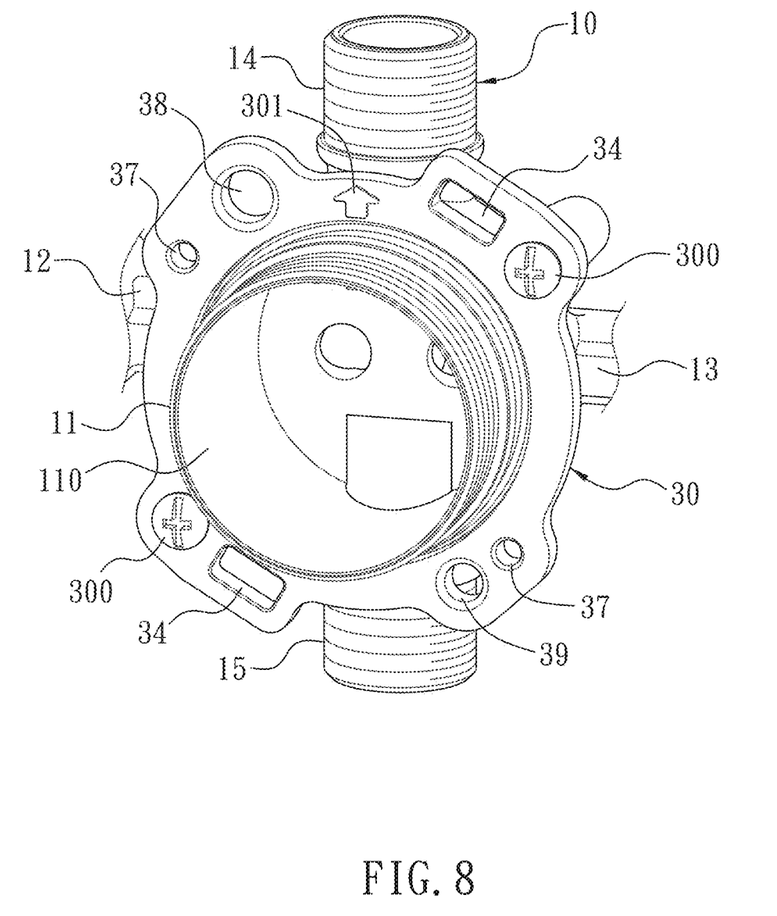
FIG. 8 is another perspective view showing the assembly of a part of the valve assembly capable of indicating the depth according to the preferred embodiment of the present invention.

As illustrated in FIGS. 2 and 6, the valve assembly 1 further comprises a positioning plate 30 includes an opening 31 configured to fit with the holder 11 of the body 10, a first fixing portion 32 and a second fixing portion 33 which are arranged on a peripheral side and respectively connect with the first coupling portion 111 and the second coupling portion 112. The positioning plate 30 also has at least two recesses 34 formed on the peripheral side thereof. The fitting portion 21 of the protective cover 20 has at least two flexible feet 213 arranged thereon so as to retain with the at least two recesses 34 of the positioning plate 30 individually, thus connecting and removing the positioning plate 30 with and from the body 10, as shown in FIG. 8.

The positioning plate 30 is made of metal and is annular, and the positioning plate 30 includes the opening 31 defined therein, the first fixing portion 32, the second fixing portion 33, and the at least two recesses 34 which are formed around the opening 31.

With reference to FIGS. 3 and 5, the holder 11 of the body 10 includes an abutting fence 113 formed thereon; the positioning plate 30 includes an outer face 35 and an inner face 36 configured to contact with the abutting fence 113. The abutting fence 113 is defined by two tabs and a stepped fringe, wherein the two tabs have the first coupling portion 111 and the second coupling portion 112 respectively formed thereon.

Referring to FIG. 5, each of the first coupling portion 111 and the second coupling portion 112 of the body 10 is a threaded hole. As shown in FIGS. 6 and 8, each of the first fixing portion 32 and the second fixing portion 33 is a through hole so that a first screw bolt 300 screws with the threaded hole via the through hole. As illustrated in FIG. 2, the positioning plate 30 is screwed on the body 10 quickly and securely.

Figure 7:
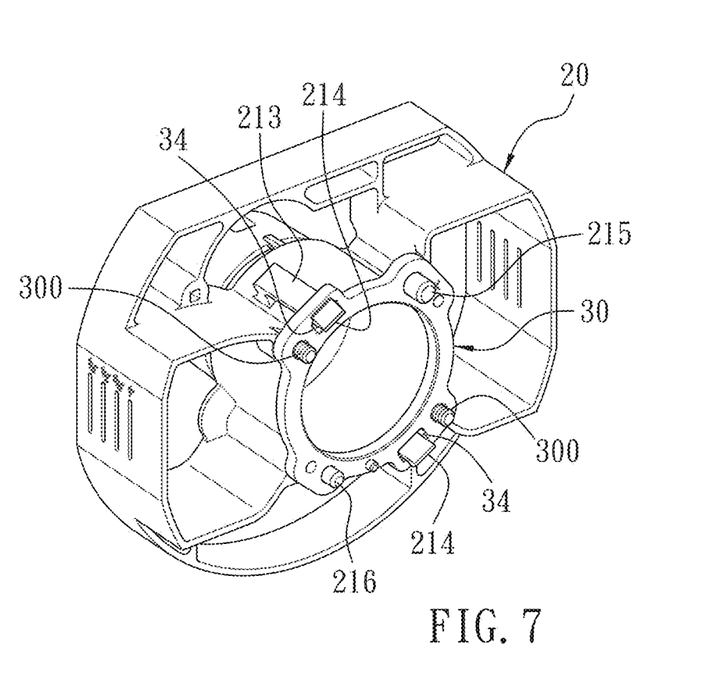
FIG. 7 is a perspective view showing the assembly of a part of the valve assembly capable of indicating the depth according to the preferred embodiment of the present invention.
Figure 9:
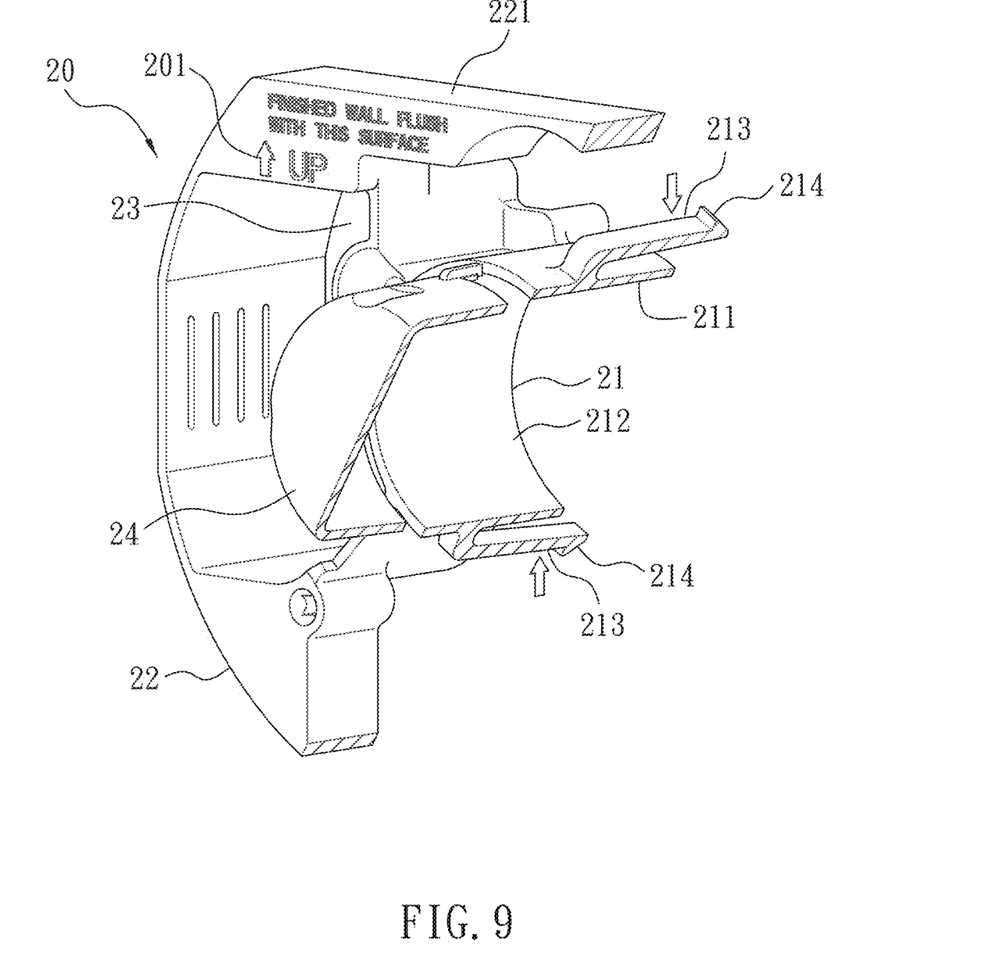
FIG. 9 is a cross-sectional perspective view showing the assembly of a part of the valve assembly capable of indicating the depth according to the preferred embodiment of the present invention.

As shown in FIGS. 7 and 9, each of the at least two flexible feet 213 has a hook 214 formed on a distal end of each flexible foot 213 so that each flexible foot 213 retains with the inner face 36 of the positioning plate 30 via each of the at least two recesses 34 after flexibly deforming. In this embodiment, each flexible foot 213 extends outward from the cylindrical fence 211.

With reference to FIG. 6, the positioning plate 30 further includes two locking orifices 37 defined on the peripheral side thereof. Referring to FIGS. 2 and 4, each of the multiple connection portions 23 has a passing orifice 231 defined thereon, wherein the passing orifice 231 has a concaved fence 232 formed on an outer end thereof so as to guide a second screw bolt to screw with each of the two locking orifices 37 after the second screw bolt moves into the passing orifice 231. The second screw bolt is configured to screw a decoration cover on the positioning plate 30 via the protective cover 20.

As shown in FIGS. 5, 6, and 8, an angle between the first coupling portion 111 and the second coupling portion 112 of the holder 11 is 180 degrees, and an angle between the first fixing portion 32 and the second fixing portion 33 of the positioning plate 30 is 180 degrees so that the first fixing portion 32 and the second fixing portion 33 respectively connect with the first coupling portion 111 and the second coupling portion 112. Alternatively, the first fixing portion 32 and the second fixing portion 33 individually connect with the second coupling portion 112 and the first coupling portion 111.

Figure 10:
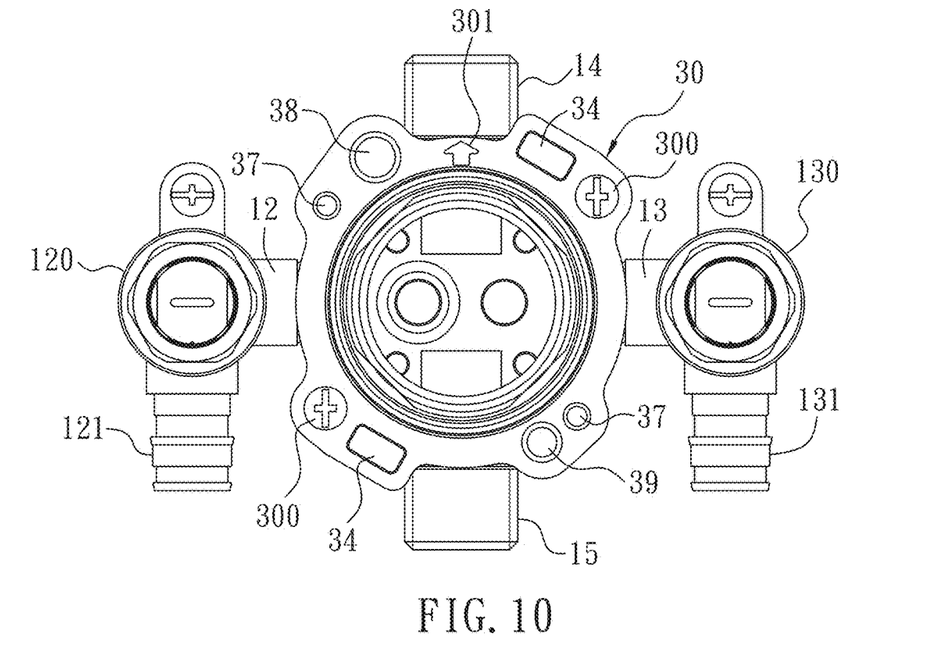
FIG. 10 is a side plan view showing the operation of the valve assembly capable of indicating the depth according to the preferred embodiment of the present invention.
Figure 11:
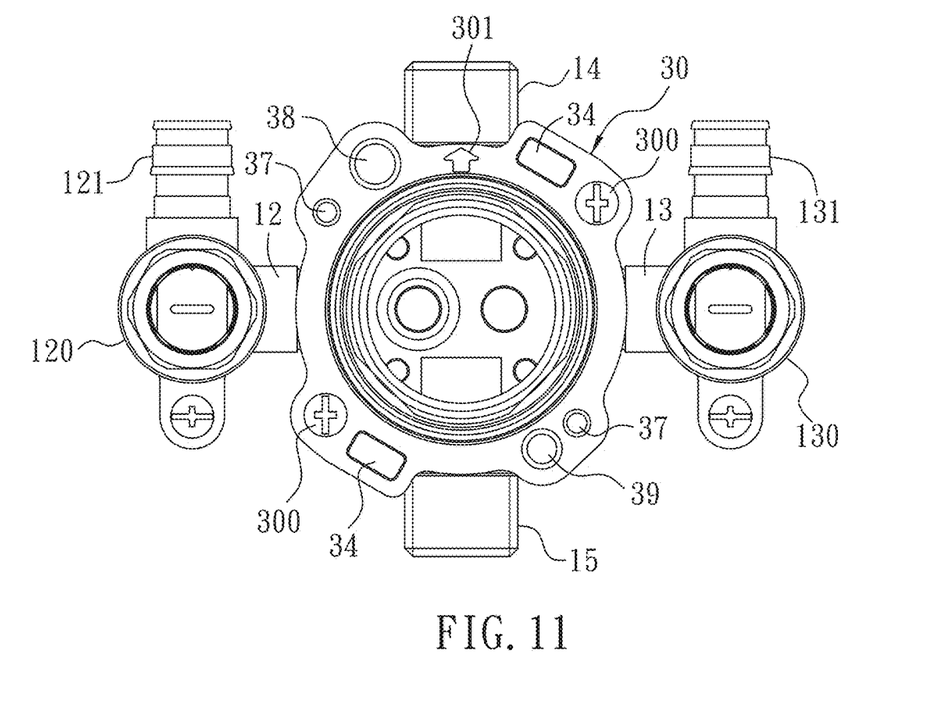
FIG. 11 is another side plan view showing the operation of the valve assembly capable of indicating the depth according to the preferred embodiment of the present invention.

As shown in FIG. 11, the cold-water inflow seat 121 and the hot-water inflow seat 131 vertically extend upward along a first direction of the body 10. As illustrated in FIG. 10, the cold-water inflow seat 121 and the hot-water inflow seat 131 vertically extend downward along a second direction of the body 10, wherein the angle between the first coupling portion 111 and the second coupling portion 112 of the holder 11 is 180 degrees so that when the body 10 is rotated between the first direction and the second direction, the first coupling portion 111 and the second coupling portion 112 are replaced by each other. The angle between the first fixing portion 32 and the second fixing portion 33 of the positioning plate 30 is 180 degrees so that when the body 10 is connected in the first direction, the first fixing portion 32 and the second fixing portion 33 are respectively connected with the first coupling portion 111 and the second coupling portion 112, and when the body 10 is connected in the second direction, the first fixing portion 32 and the second fixing portion 33 are respectively connected with the second coupling portion 112 and the first coupling portion 111. The positioning plate 30 includes a first connecting orifice 38 and a second connecting orifice 39 which are separately defined on the peripheral side of the positioning plate 30.

With reference to FIG. 4, the fitting portion 21 of the protective cover 20 has a first affix bolt 215 and a second affix bolt 216 which are respectively fixed in the first connecting orifice 38 and the second connecting orifice 39.

A diameter of the first connecting orifice 38 is more than the second connecting orifice 39, and a shape of a cross section of first connecting orifice 38 is different from the second connecting orifice 39. A diameter of the first affix bolt 215 is more than the second affix bolt 216.

Figure 12:
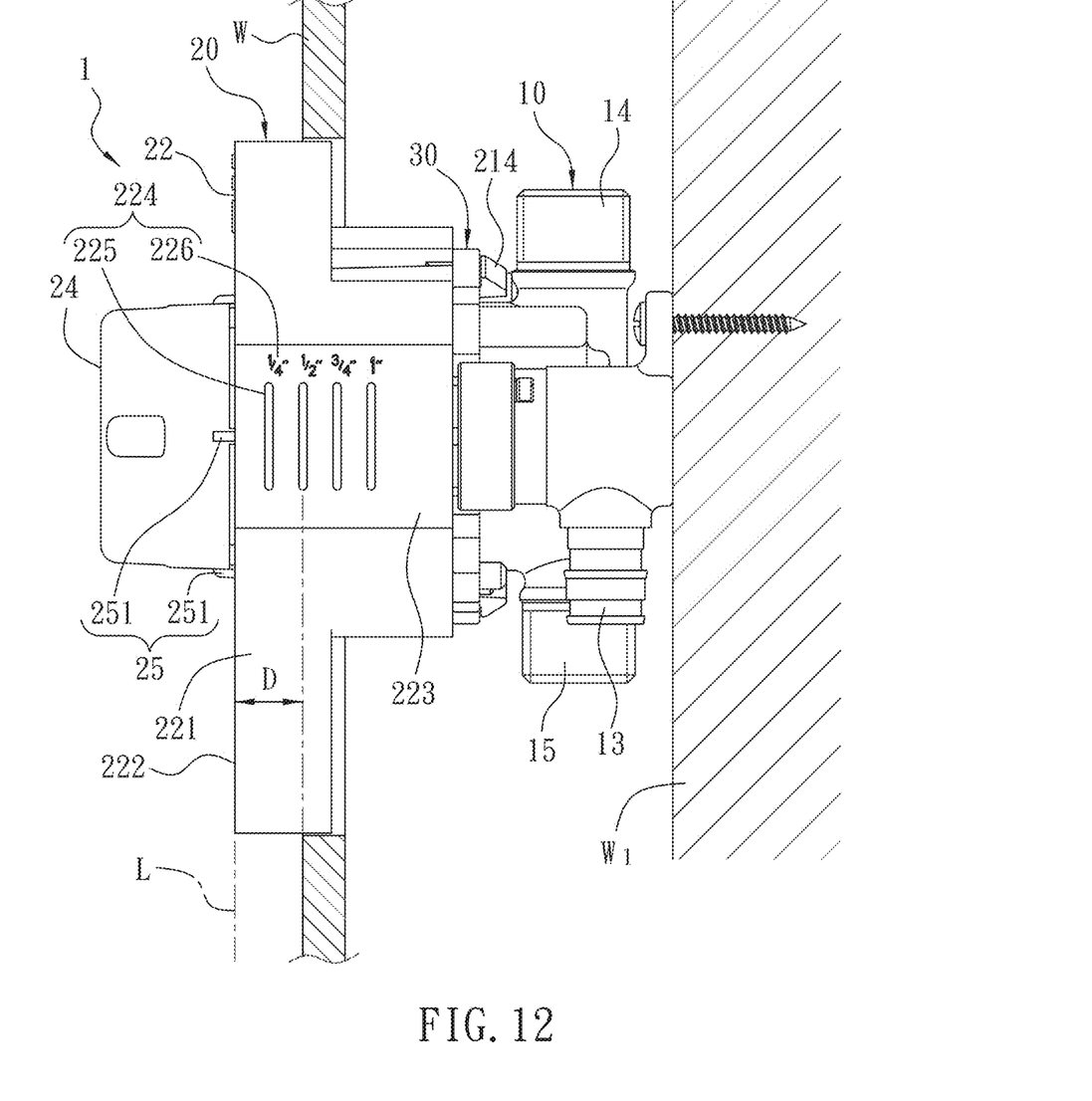
FIG. 12 is a cross sectional view showing the application of the valve assembly capable of indicating the depth according to the preferred embodiment of the present invention.

Referring to FIG. 12, the body 10 is mounted on a wooden rack W1 in a basic wall W, and the holder 11 of the body 10 includes an accommodation chamber 110 configured to accommodate a mixing valve and a control bar for controlling the mixing valve so that after cold water from the cold-water inflow connector 12 and hot water from the hot-water inflow connector 13 flow into the holder 11, they are controlled by the mixing valve and the control bar so as to mix in the first outflow connector 14 or the second outflow connector 15 at a predetermined temperature and a predetermined flow. The mixing valve mates with a pressure balance valve so as to obtain a constant temperature in the first outflow connector 14 or the second outflow connector 15. The first outflow connector 14 is in connection to a shower via an upper water tube 4, and the second outflow connector 15 is coupled to a faucet via a lower water tube 5. Since the mixing valve, the control bar, the shower, and the faucet are well-known art, further remarks are not disclosed in FIGS. 1-13.

As shown in FIGS. 2 and 5, the cold-water inflow connector 12 has a first fixer 120 configured to house a first stop set 122, and the hot-water inflow connector 13 has a second fixer 130 configured to house a second stop set 13 such that the cold water and the hot water respectively flowing through the cold-water inflow connector 12 and the hot-water inflow connector 13 are controlled to flow or stop flowing, as illustrated in FIG. 4.

Figure 13:
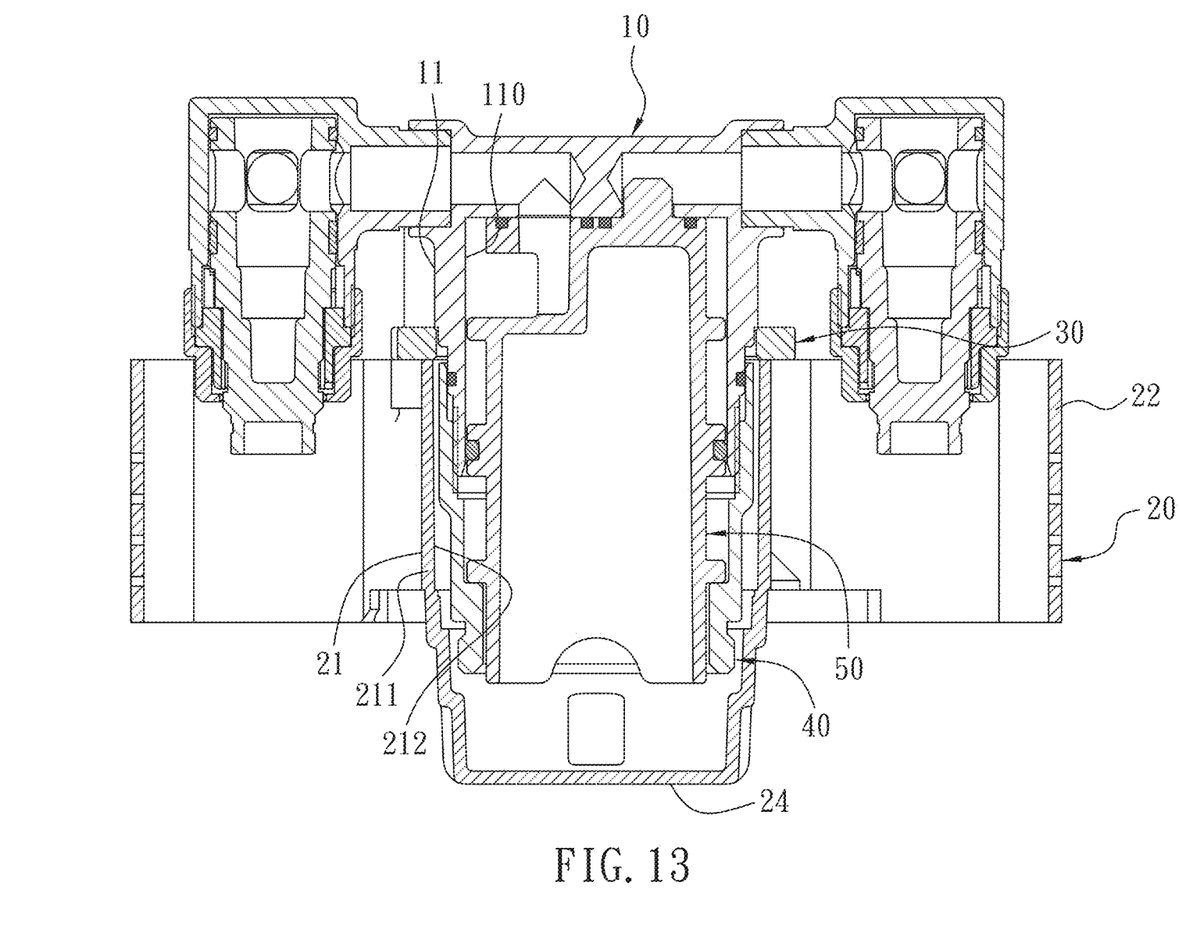
FIG. 13 is another cross sectional view showing the application of the valve assembly capable of indicating the depth according to the preferred embodiment of the present invention.

With reference to FIGS. 2 and 3, the valve assembly 1 further a screwing sleeve 40 configured to screw with the holder 11. The notch 212 of the protective cover 20 is fitted with the screwing sleeve 40. In a pressure test of the accommodation chamber 110 of the holder 11, a pressure testing cap 50 is housed in the accommodation chamber 110, as shown in FIG. 13, such that the screwing sleeve 40 forces the pressure testing cap 50 to accommodate in the accommodation chamber 110 so as to test whether air, the cold water, and the hot water leak out of the cold-water inflow pipe 2, the hot-water inflow pipe 3, the upper water tube 4 or the lower water tube 5. After constructing a finished wall, the mixing valve is housed in the accommodation chamber 110 and is forced by the screwing sleeve 40. As shown in FIG. 12, the finished wall is constructed on the basic wall W, such as adhering tiles, wherein an alignment line L represents an outer face of the finished wall and aligns with the front fence 222.

The capping portion 24 is twisted and snapped after constructing the finished wall so that the mixing valve is accommodated in the accommodation chamber 110 via the notch 212 of the protective cover 20, and the screwing sleeve 40 is screwed with the holder 11, thereafter the decoration cover and the control bar are mounted.

Referring to FIGS. 2, 6 and 9, two arrows 301, 201 are marked on the positioning plate 30 and the front fence 222 of the protective cover 20 individually. Preferably, indicating characters, such as "UP" are marked on the front fence 222 so that the user knows the protective cover 20 is fixed upward.

After the positioning plate 30 is connected with the body 10, it is not removable, and each flexible foot 213 retains with each recess 34 so as to fix the protective cover 20 with the positioning plate 30. As shown in FIG. 9, each flexible foot 213 is pressed so as to remove the hook 214 from the inner face 36 of the positioning plate 30 and each recess 34, thus removing the protective cover 20 from the positioning plate 30 easily and quickly.

As connecting the valve assembly 1, the cold-water inflow pipe 2, the hot-water inflow pipe 3, the upper water tube 4 or the lower water tube 5, the user learns a distance D between the basic wall W and the outer face of the finished wall by way of each indication part 224, as illustrated in FIG. 12. Accordingly, the outer face of the finished wall flushes with the front fence 222 of the protective cover 20 as connecting the valve assembly 1. Each indication part 224 of the protective cover 20 is capable of determining a fixing depth of the valve assembly 1 quickly by adjusting a thickness and a position of the wooden rack W1.

The first outflow connector 14 of the body 10 is mounted and faces upward or downward, as shown in FIGS. 10 and 11.

Referring to FIG. 11, the valve assembly 1 is connected in the first direction. As illustrated in FIG. 10, the valve assembly 1 is connected in the second direction, the positioning plate 30 is connected on the body 10 and faces upward by using the arrow 301, and the cold-water inflow seat 121 and the hot-water inflow seat 131 vertically extend downward along the second direction of the body 10, wherein the arrow 301 indicates upwardly, and the protective cover is fixed upward by using the arrow 201.

When the valve assembly 1 is connected in the first direction, the arrow 301 of the positioning plate 30 indicates downward so that the positioning plate 30 is detached and is turned 180 degrees upside down, in the meantime, the first affix boll 215 of the protective cover 20 aligns with but does not retain with the second connecting orifice 39 of the positioning plate 30, and the second affix bolt 216 is in alignment with but does not retain with the first connecting, orifice 38, thus avoiding fixing the protective cover 20 wrongly.

No matter the body 10 is connected in the first direction or the second direction, the positioning plate 30 is fixed exactly after being removed and turned 180 degrees upside down so that the arrow 301 of the positioning plate 30 faces upward, and the arrow 201 of the protective cover 20 indicates upward, as illustrated in FIGS. 10 and 11.

Preferably, a foolproof device is defined between the protective cover 20 and the positioning plate 30 so as to be applicable for the cold-water inflow seat 121 and the hot-water inflow seat 131 which extend horizontally, wherein the arrow 301 of the positioning plate 30 faces upward. After the body 10 is in connection with the cold-water inflow pipe 2, the hot-water inflow pipe 3, the upper water tube 4, and the lower water tube 5, the positioning plate 30 is fixed quickly after being turned upside down.

The protective cover 20 is connected with and removed from the body 10 easily and quickly by using the positioning plate 30 so as to facilitate the pressure test and the maintenance. Preferably, the protective cover 20 is connected with the body 10 directly by way of screwing element(s), and the each indication part 224 of the protective cover 20 is capable of determining the fixing depth of the valve assembly 1.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A valve assembly capable of indicating a depth comprising:
    a body including a holder;
    a protective cover connected with the holder of the body, and the protective cover including a fitting portion configured to fit with the holder, a peripheral portion surrounding the fitting portion, and at least one first connection portion configured to connect with the fitting portion and the peripheral portion;
    wherein the peripheral portion has an external fence, a front fence, a marking portion formed on at least one side of the peripheral portion, and multiple indication parts arranged on the marking portion and configured to denote depths relative to the front fence, respectively;
    wherein the holder includes a cold-water inflow connector horizontally extending from a first side thereof, a hot-water inflow connector horizontally extending from a second side of the holder opposite to the cold-water inflow connector, a first outflow connector vertically extending from a top of the holder, and a second outflow connector vertically extending from a bottom of the holder opposite to the first outflow connector; wherein the cold-water inflow connector has a cold-water inflow seat configured to connect with a cold-water inflow pipe, and the hot-water inflow connector has a hot-water inflow seat configured to connect with a hot-water inflow pipe; wherein the holder further includes a first coupling portion and a second coupling portion extending on an outer wall of the holder;
    wherein the valve assembly further comprises a positioning plate including an opening configured to fit with the holder of the body, a first fixing portion and a second fixing portion which are arranged on a peripheral side of the positioning plate and respectively connect with the first coupling portion and the second coupling portion; wherein the positioning plate also has at least two recesses formed on the peripheral side thereof; and wherein the fitting portion of the protective cover has at least two flexible feet arranged thereon so as to retain with the at least two recesses of the positioning plate respectively, thus removably connecting the positioning plate with the body.

2. The valve assembly as claimed in claim 1, wherein each of the multiple indication parts has at least one elongated element longitudinally arranged thereon.

3. The valve assembly as claimed in claim 2, wherein each elongated element is any one of a through hole and a recessed slot.

4. The valve assembly as claimed in claim 2, wherein each elongated element is a rib.

5. The valve assembly as claimed in claim 2, wherein each indication part further has a size symbol corresponding to each elongated element so as to denote a depth between each elongated element and the front fence.

6. The valve assembly as claimed in claim 1, wherein the fitting portion of the protective cover has a cylindrical fence in which a notch is defined so as to fit with the outer wall of the holder; the protective cover further includes a capping portion configured to cover the notch, and the protective cover includes a second connection portion configured to connect with the cylindrical fence and the capping portion; the second connection portion is manually snapped by a user so as to remove the capping portion from the fitting portion.

7. The valve assembly as claimed in claim 6, wherein the second connection portion comprises multiple elongated wings configured to be manually snapped by twisting the capping portion.

8. The valve assembly as claimed in claim 1, wherein the positioning plate is made of metal.

9. The valve assembly as claimed in claim 1, wherein the positioning plate is annular, and the positioning plate includes the opening defined therein, the first fixing portion, the second fixing portion, and the at least two recesses which are formed around the opening.

10. The valve assembly as claimed in claim 1, wherein the holder of the body includes an abutting fence formed thereon; the positioning plate includes an outer face and an inner face configured to contact with the abutting fence.

11. The valve assembly as claimed in claim 1, wherein each of the first coupling portion and the second coupling portion of the body is a threaded hole, each of the first fixing portion and the second fixing portion is a through hole so that a first screw bolt screws with one of the threaded holes via one of the through holes, and the positioning plate is screwed on the body quickly and securely.

12. The valve assembly as claimed in claim 1, wherein the positioning plate includes an outer face and an inner face; each of the at least two flexible feet has a hook formed on a distal end thereof so that each flexible foot retains with the inner face of the positioning plate via one of the at least two recesses after flexibly deforming.

13. The valve assembly as claimed in claim 1, wherein the fitting portion of the protective cover has a cylindrical fence, each of the two flexible feet extends outward from the cylindrical fence, and the cylindrical fence has a notch defined therein and configured to fit with the outer wall of the holder; the protective cover further includes a capping portion configured to cover the notch, and the protective cover includes a second connection portion configured to connect with the cylindrical fence and the capping portion; and the second connection portion is manually snapped by a user so as to remove the capping portion from the fitting portion.

14. The valve assembly as claimed in claim 13, wherein the second connection portion has multiple elongated wings configured to be manually snapped by twisting the capping portion.

15. The valve assembly as claimed in claim 13 further comprising a screwing sleeve configured to screw with the holder, and the notch of the protective cover is fitted with the screwing sleeve.

16. The valve assembly as claimed in claim 1, wherein the positioning plate further includes two locking orifices defined on the peripheral side thereof; each of the at least one first connection portions has a passing orifice defined thereon, wherein each passing orifice has a concaved fence formed on an outer end thereof so as to guide a respective second screw bolt to screw with a respective locking orifices after the respective second screw bolt moves into the respective passing orifice.

17. The valve assembly as claimed in claim 1, wherein an angle between the first coupling portion and the second coupling portion of the holder is 180 degrees, and an angle between the first fixing portion and the second fixing portion of the positioning plate is 180 degrees so that the first fixing portion and the second fixing portion respectively connect with the first coupling portion and the second coupling portion, alternatively, the first fixing portion and the second fixing portion respectively connect with the second coupling portion and the first coupling portion.

18. The valve assembly as claimed in claim 1, wherein the cold-water inflow seat and the hot-water inflow seat vertically extend upward in a first direction of the body, and the cold-water inflow seat and the hot-water inflow seat vertically extend downward in a second direction of the body; wherein the angle between the first coupling portion and the second coupling portion of the holder is 180 degrees so that when the body is rotated between the first direction and the second direction, the first coupling portion and the second coupling portion are replaced by each other; the angle between the first fixing portion and the second fixing portion of the positioning plate is 180 degrees so that when the body is connected in the first direction, the first fixing portion and the second fixing portion are respectively connected with the first coupling portion and the second coupling portion, and when the body is connected in the second direction, the first fixing portion and the second fixing portion are respectively connected with the second coupling portion and the first coupling portion; the positioning plate includes a first connecting orifice and a second connecting orifice which are separately defined on the peripheral side of the positioning plate, wherein the first connecting orifice is different from the second connecting orifice.

19. The valve assembly as claimed in claim 18, wherein a diameter of the first connecting orifice is more than a diameter of the second connecting orifice.

20. The valve assembly as claimed in claim 18, wherein a shape of a cross section of the first connecting orifice is different from a shape of the second connecting orifice.

21. The valve assembly as claimed in claim 18, wherein the fitting portion of the protective cover has a first affix bolt and a second affix bolt which are respectively fixed in the first connecting orifice and the second connecting orifice.

* * * * *